United States Patent
Zhuang et al.

(10) Patent No.: US 11,008,242 B2
(45) Date of Patent: May 18, 2021

(54) DEEP SLUDGE DEWATERING METHOD USING ELECTROOSMOSIS WITH FILTER BAGS

(71) Applicant: PowerChina Huadong Engineering Corporation Limited, Zhejiang (CN)

(72) Inventors: Yingchun Zhuang, Zhejiang (CN); Rui Song, Zhejiang (CN); Chen Liu, Zhejiang (CN); Dundun Shi, Zhejiang (CN); Shiming Liu, Zhejiang (CN)

(73) Assignee: PowerChina Huadong Engineering Corporation Limited, Hangzhou (CN)

( * ) Notice: Subject to any disclaimer, the term of this patent is extended or adjusted under 35 U.S.C. 154(b) by 26 days.

(21) Appl. No.: 16/504,256

(22) Filed: Jul. 6, 2019

(65) Prior Publication Data

US 2020/0140311 A1 May 7, 2020

(30) Foreign Application Priority Data

Nov. 1, 2018 (CN) .......................... 201811293358.2

(51) Int. Cl.
| | | |
|---|---|---|
| *C02F 1/469* | (2006.01) | |
| *C02F 11/15* | (2019.01) | |
| *B01D 61/56* | (2006.01) | |
| *C02F 11/00* | (2006.01) | |
| *B01D 35/06* | (2006.01) | |

(52) U.S. Cl.
CPC .............. *C02F 11/15* (2019.01); *B01D 61/56* (2013.01); *C02F 11/006* (2013.01); *B01D 35/06* (2013.01); *C02F 1/4698* (2013.01); *C02F 2201/46* (2013.01)

(58) Field of Classification Search
CPC ...... C02F 11/15; C02F 11/006; C02F 1/4698; C02F 2201/46; C02F 11/121; B01D 61/56; B01D 35/06; B01D 2313/20; B01D 63/087; B01D 69/06; B01D 61/427
See application file for complete search history.

(56) References Cited

U.S. PATENT DOCUMENTS 3,664,940 A * 5/1972 Greyson ................ B01D 61/56
204/519

FOREIGN PATENT DOCUMENTS

| CN | 101838095 A | 9/2010 |
|---|---|---|
| CN | 102603151 B | 7/2012 |
| CN | 106746471 A | 5/2017 |

* cited by examiner

*Primary Examiner* — Arun S Phasge

(57) ABSTRACT

A deep sludge dewatering method using electroosmosis with filter bags, including (1) placing a filter bag on a slope on which a cathode electrode is arranged; (2) injecting sludge into the filter bag, and after the filter bag is filled with the sludge, closing an inlet of the filter bag; and (3) laying an anode electrode on the filter bag filled with the sludge, and connecting the cathode electrode and the anode electrode to a DC power supply via an electric wire, and carrying out energization for electroosmosis so that water flows down the slope. The present invention can be used for recycling of the sludge produced in underground and tunnel excavation projects, and has the advantages of large processing capacity, simple process, good treatment effect and available resource recycling.

3 Claims, 3 Drawing Sheets

DEEP SLUDGE DEWATERING METHOD USING ELECTROOSMOSIS WITH FILTER BAGS

CROSS-REFERENCE TO RELATED APPLICATIONS

This application claims the benefit of priority from Chinese Patent Application No. CN201811293358.2, filed on Nov. 1, 2018. The content of the aforementioned application, including any intervening amendments thereto, is incorporated herein by reference in its entirety.

TECHNICAL FIELD

The present invention relates to sludge dewatering and curing treatment, more particularly to a deep sludge dewatering method using electroosmosis with filter bags.

BACKGROUND OF THE INVENTION

Due to the rapid development of undergrounds and tunnels in China, a large amount of sludge is produced in underground and tunnel excavation projects. The sludge has a water content of 75-95%, i.e., 75-95 parts by weight of water in 100 parts by weight of sludge. The sludge is usually transported and dumped to mountainous areas or abandoned mines by large filling trucks, causing environment pollution. As there is a higher requirement for environmental protection in China, the reduction, recycling and harmless treatment of construction sludge is an urgent problem to be solved at present.

Existing methods for treating mud from construction include a plate-frame pressure filtration method, a belt pressure filtration method, centrifugation, and electroosmosis. The plate-frame pressure filtration method is a batch treatment process with inefficient processing. The belt pressure filtration and centrifugation have the advantage of short processing time, but there is a high moisture content in the treated mud, and thus it is hard to meet the dewatering requirement.

SUMMARY OF THE INVENTION

The present invention aims to provide a deep sludge dewatering method using electroosmosis with filter bags, which has high efficiency and is capable of deeply dewatering the sludge. Technical solutions of the present invention are described as follows.

A deep sludge dewatering method using electroosmosis with filter bags, comprising:

(1) placing a filter bag on a slope on which a cathode electrode is arranged;

(2) injecting sludge into the filter bag, and after the filter bag is filled with the sludge, closing an inlet of the filter bag; and (3) laying an anode electrode on the filter bag filled with the sludge, and connecting the cathode electrode and the anode electrode to a DC power supply via an electric wire, and carrying out energization for electroosmosis so that water flows down the slope.

In some embodiments, the energization is carried out after there is significantly less water flowing out of the filter bag by gravity.

In some embodiments, an upper surface of the slope is provided with a drainable groove.

In some embodiments, after the sludge is dewatered in step (3), repeating steps (2) and (3) until the filter bags are filled with the dewatered sludge.

In some embodiments, in step (1), a plurality of layers of filter bags are stacked on the slope; an insulating plate is arranged between two adjacent layers, and a cathode electrode for a layer of filter bag is arranged on an upper surface of the insulating plate located below the layer of filter bag, and an anode electrode of another layer of filter bag is arranged on a lower surface of the insulating plate located above the another layer of filter bag. In step (2), the sludge is sequentially injected into the filter bags from bottom to top. The upper surface of the insulating plate may be provided with a drainable groove.

In some embodiments, a support with a plurality of support structures is provided to respectively support the plurality of filter bags of a second layer and above the second layer, and the plurality of support structures are adjustable. The method further comprises: after the sludge is dewatered in step (3), adjusting heights of the support structures to respectively raise the filter bags of the second layer and above the second layer, so that the filter bags are separated from each other; then filling the filter bags with the sludge from bottom to top, wherein the support structure for corresponding layer is lowered before the sludge is filled, and an upper layer of filter bag is stacked on a lower layer of filter bag; and repeating steps (1) and (2) until the filter bags are filled with the dewatered sludge.

In some embodiments, a gradient of the slope is 10°-20°.

In some embodiments, the filter bag is in a flat shape having a bottom surface, a top surface and a side surface.

The present invention can be used for recycling of the sludge produced in underground and tunnel excavation projects, providing the following beneficial effects.

1: The present invention has a large processing capacity, and the size of the filter bags may be customized according to the actual amount of sludge. The filter bags can be stacked for electroosmosis to save space on site.

2: The process and operation is simple, and large high-pressure filtration equipments are not required.

3: It has a good treatment effect, resulting in a moisture content of the sludge of less than 30% after electroosmosis treatment.

4: Resources can be recycled. The solidified sludge has been packaged in bags, which can be directly used for reinforcement of cofferdams and dams, thereby achieving resource recycling. Since the sludge can be injected into the bags by pumps, it saves the labor cost for filling the filter bags with the sludge.

DETAILED DESCRIPTION OF EMBODIMENTS

Figure 1:
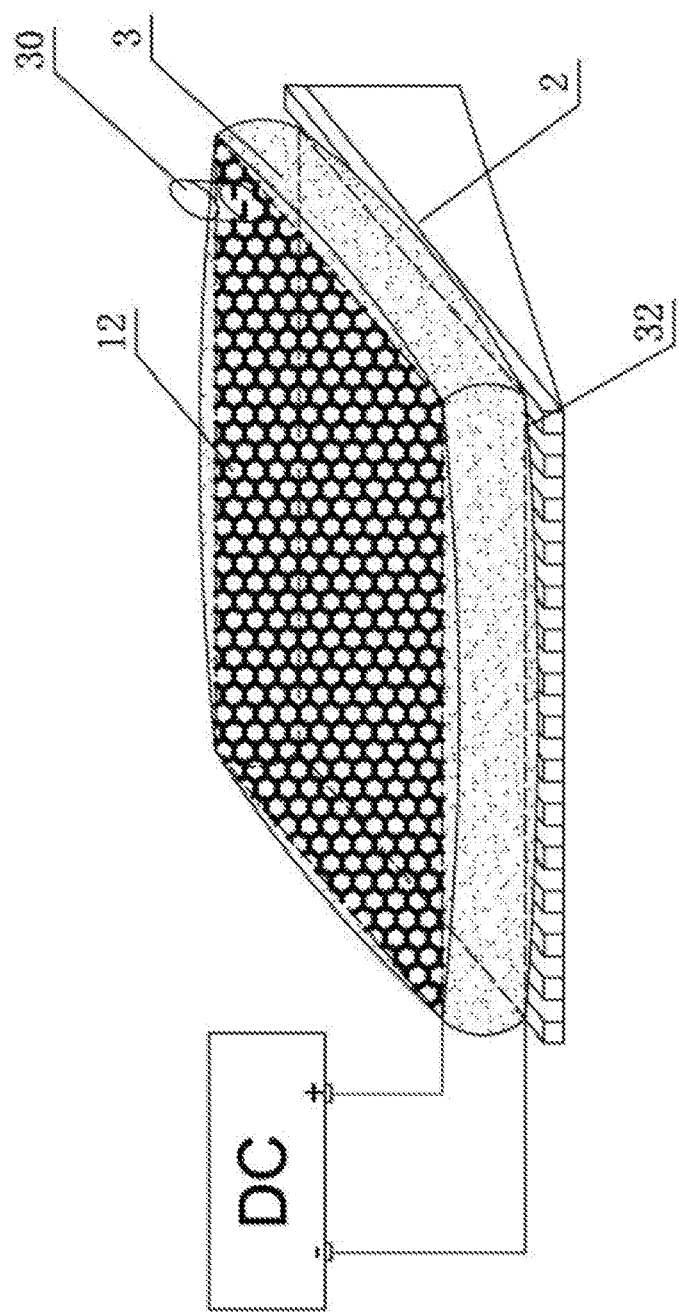
FIG. 1 is a schematic diagram of a dewatering system of the present invention.
Figure 2:
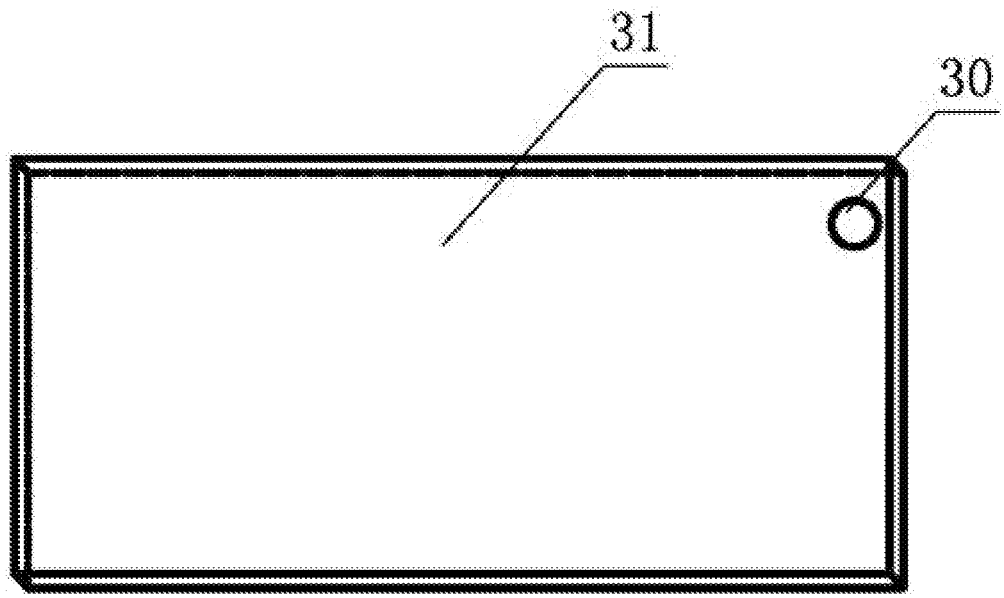
FIG. 2 is a top view of a filter bag.
Figure 3:
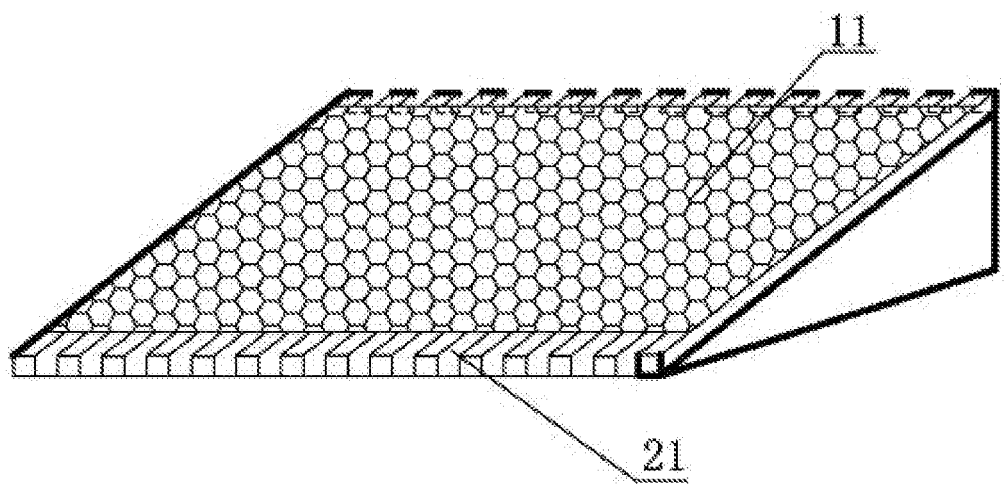
FIG. 3 is a schematic diagram of a slope of the present invention.
Figure 4:
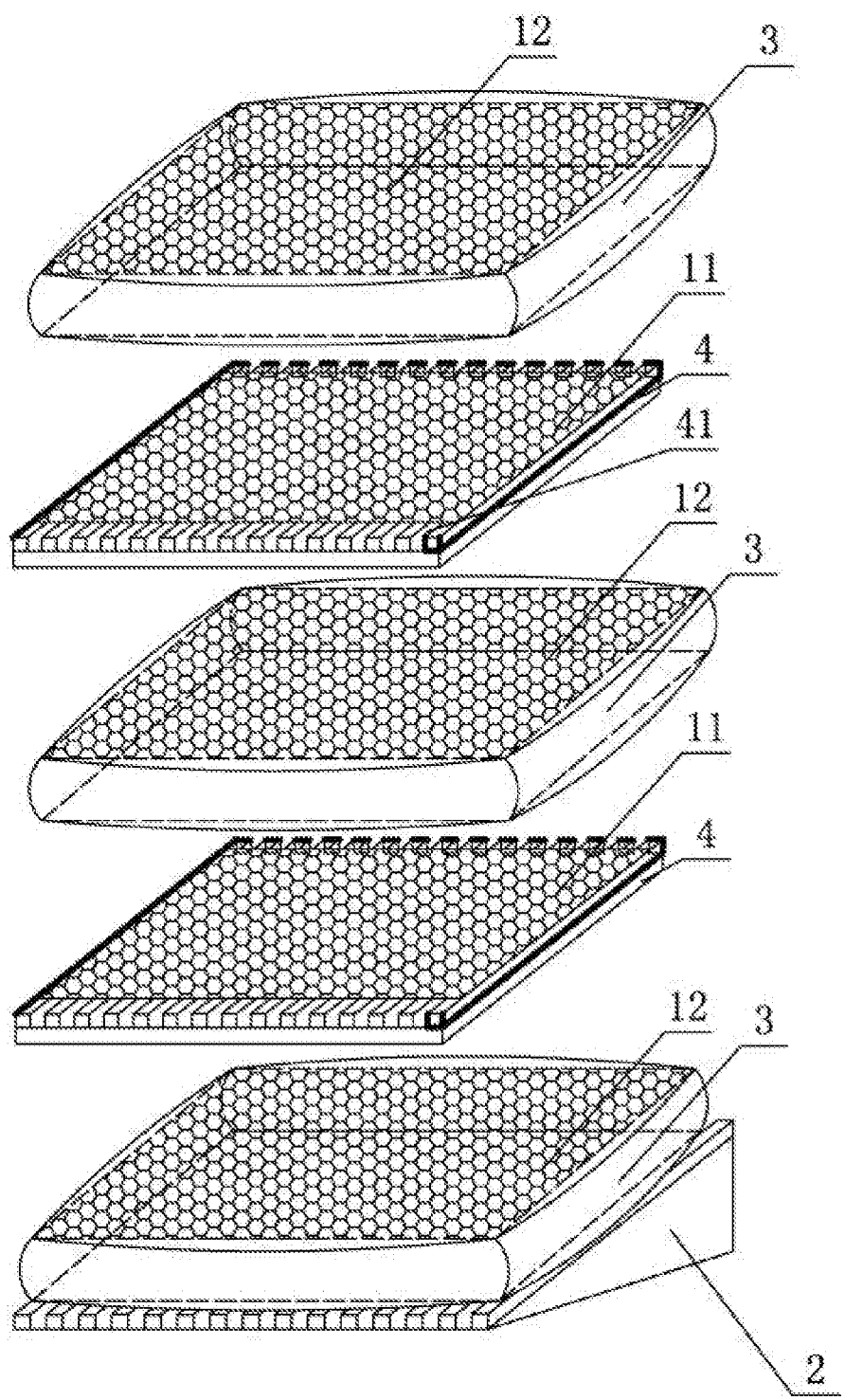
FIG. 4 is an exploded view showing the filter bags being dewatered in a stack fashion.

Referring to the figures, illustrated is a deep sludge dewatering method using electroosmosis with filter bags comprising the following steps.

(1) A filter bag 3 is placed on a slope 2 on which a cathode electrode 11 is arranged. The filter bag 3 can be made of high-strength woven cloth film bag or the like which is suitable for filtering water and has a certain strength to prevent soil from falling out.

(2) Sludge is injected into the filter bag 3, and after the filter bag is filled with the sludge, an inlet 30 of the filter bag is closed. For example, the inlet can be tightly fastened with an iron wire; for example, when the filter bag has a feed tube, the feed tube can be tightened with the iron wire. If the filter bag is provided with a tube cap or a valve, a corresponding closing operation is performed.

(3) An anode electrode 12 is laid on the filter bag 3 filled with sludge, and the cathode electrode 11 and the anode electrode 12 are connected to a DC power supply via an electric wire, and energization is carried out for electroosmosis, so that water flows down the slope.

Preferably, if the sludge has an extremely high moisture content, the energization is carried out after there is significantly less water flowing out of the filter bag by gravity. For example, gravity filtration is used to reduce the moisture content from 75-95% to 50-60% followed by energization for electroosmosis, such that the overall efficiency are ensured and energy is saved.

Preferably, a energization voltage for electroosmosis is 40-60 V. Taking the sludge with the moisture content of 75% as an example, the dewatering time is 12 h for discharging water by gravity and about 3 days for discharging water by electroosmosis. The processing capacity depends on the size of the filter bag, for example, a filter bag of 10 m×10 m can treat the sludge of 80 $m^3$ at a time.

An upper surface of the slope 2 may be provided with a drainable groove 21. A gradient of the slope 2 is preferably 10°-20°, which not only facilitates the drainage of water, but also prevents the sludge from being excessively squeezed to a lower side by gravity to reduce the electroosmotic dewatering efficiency.

The filter bag 3 is in a flat shape having a bottom surface 31, a top surface 32 and a side surface. A width and a length of the filter bag are at least several times the height of the filter bag.

Preferably, the dewatering is carried out in a stacked manner. In step (1), a plurality of layers of filter bags are stacked on the slope, and an insulating plate 4 is arranged between two adjacent layers. The cathode electrode 11 for a layer of filter bag is arranged on an upper surface of the insulting plate located below the layer of filter bag, and the anode electrode 12 of another layer of filter bag is arranged on a lower surface of the insulting plate located above the another layer of filter bag. In step (2), the sludge is sequentially injected into the filter bags from bottom to top. In some embodiments, an upper surface of the insulating plate 4 is provided with a drainable groove 41.

Generally, three layers of filter bags are stacked.

In order to facilitate resource recycling, the filter bag can be filled with the sludge continuously and accumulatively for dewatering. After the sludge is dewatered in step (3), the filter bag is not taken off, and steps (2) and (3) are repeated until the filter bags are filled with the dewatered sludge. In this way, the method not only saves the filter bag, but it is more suitable for the reinforcement of cofferdams and dams and resource recycling.

The dewatering is carried out in a stacked manner, in which a support with a plurality of support structures is provided to respectively support the filter bags of the second layer and above the second layer. The support structures is adjustable, for example, several support structures are arranged at a firm support, and the support structures connected with a mechanism using nuts and screws are adjustable, or can be adjusted and supported by equipment such as a lifting jack. After the sludge is dewatered in step (3), heights of the support structures are adjusted to respectively raise the filter bag of the second layer and above the second layer, so that the filter bags are separated from each other. If the stacking layer as 3, the first layer, i.e., the bottom layer is supported by the slope. The second and third layers are respectively supported by the support structures thereof, so that adjacent layers are separated from each other, and the number of the filter bags in each layer can be designed. Then, the filter bags are filled with the sludge from bottom to top, and the support structure of the filter bag of the corresponding layer is lowered before the sludge is injected, so that the upper filter bag is stacked on the lower filter bag. Steps (2) and (3) are repeated until the filter bags are filled with dewatered sludge.

The above description is only the embodiments of the present invention, but the features of the present invention are not limited thereto. Any changes or modifications made by those skilled in the art without departing from the spirit and idea of the present invention fall within the scope of the appended claims.

What is claimed is:

1. A deep sludge dewatering method using electroosmosis with filter bags, comprising:
    (1) placing a filter bag on a slope on which a cathode electrode is arranged;
    (2) injecting sludge into the filter bag, and after the filter bag is filled with the sludge, closing an inlet of the filter bag; and
    (3) laying an anode electrode on the filter bag filled with the sludge, and connecting the cathode electrode and the anode electrode to a DC power supply via an electric wire, and carrying out energization for electroosmosis so that water flows down the slope;
    wherein in step (1), a plurality of layers of filter bags are stacked on the slope; an insulating plate is arranged between two adjacent layers, and a cathode electrode for a layer of filter bag is arranged on an upper surface of the insulting plate located below the layer of filter bag, and an anode electrode of another layer of filter bag is arranged on a lower surface of the insulating plate located above the another layer of filter bag; and in step (2), the sludge is sequentially injected into the filter bags from bottom to top.

2. The deep sludge dewatering method of claim 1, wherein an upper surface of the insulating plate is provided with a drainable groove.

3. The deep sludge dewatering method of claim 1, wherein a support with a plurality of support structures is provided to respectively support the plurality of filter bags of a second layer and above the second layer; and the plurality of support structures are adjustable;
    the method further comprises: after the sludge is dewatered in step (3), adjusting heights of the support structures to respectively raise the filter bags of the second layer and above the second layer, so that the filter bags are separated from each other; then filling the filter bags with the sludge from bottom to top, wherein the support structure for corresponding layer is lowered before the sludge is filled, and an upper layer of filter bag is stacked on a lower layer of filter bag; and repeating steps (1) and (2) until the filter bags are filled with the dewatered sludge.

* * * * *